US011225327B2

(12) United States Patent
Perera et al.

(10) Patent No.: US 11,225,327 B2
(45) Date of Patent: Jan. 18, 2022

(54) DIVIDER SCREEN ASSEMBLY (71) Applicant: Safran Seats GB Limited, Wales (GB)

(72) Inventors: Bethmage Kalpa Nadeeshan Perera, Wales (GB); Patrick James Smith, Wales (GB); Piumal Shayanga Wijewickrama, Wales (GB); Paul John Wills, Wales (GB)

(73) Assignee: Safran Seats GB Limited, Wales (GB)

( * ) Notice: Subject to any disclaimer, the term of this patent is extended or adjusted under 35 U.S.C. 154(b) by 347 days.

(21) Appl. No.: 16/279,332

(22) Filed: Feb. 19, 2019

(65) Prior Publication Data
US 2019/0308734 A1 Oct. 10, 2019

(30) Foreign Application Priority Data

Apr. 9, 2018 (GB) .................................... 1805875

(51) Int. Cl.
*B64D 11/06* (2006.01)
(52) U.S. Cl.
CPC ...... *B64D 11/0606* (2014.12); *B64D 11/0641* (2014.12)
(58) Field of Classification Search
CPC . B64D 11/0641; B64D 11/0606; E06B 3/921; E06B 3/924; E06B 3/4415; E06B 3/4423; E06B 3/927; E06B 2009/2452
See application file for complete search history.

(56) References Cited

U.S. PATENT DOCUMENTS 2,555,032 A * 5/1951 Hall .......................... A47D 7/03
5/100
2,862,253 A * 12/1958 Place ...................... E04B 1/343
52/66
(Continued)

FOREIGN PATENT DOCUMENTS

EP         1582457 A1    10/2005
WO      2005/080196      9/2005
(Continued)

OTHER PUBLICATIONS

Europe Patent Application No. 19156995.3, Search Report, dated Jul. 29, 2019, 8 pages.

*Primary Examiner* — Christopher D Hutchens
(74) *Attorney, Agent, or Firm* — Kilpatrick Townsend & Stockton LLP (57) ABSTRACT The present invention provides a divider screen assembly for an aircraft seating arrangement, the divider screen assembly comprising a divider screen moveable between a lower height in a stowed configuration, and an upper height in a deployed configuration, a first actuation mechanism being actuable to allow movement of the divider screen between the upper height and an intermediate height in between the upper height and the lower height, a second actuation mechanism being actuable to allow movement of the divider screen between the intermediate height and the lower height, wherein the second actuation mechanism is actuable only when the screen has been lowered to the intermediate height. The present invention also provides an aircraft accommodation arrangement, a method of stowing a divider screen and a method of deploying a divider screen.

23 Claims, 5 Drawing Sheets (56) References Cited

U.S. PATENT DOCUMENTS

| | | | | |
|---|---|---|---|---|
| 3,698,465 | A  * | 10/1972 | Aberg | E06B 3/921 |
| | | | | 160/222 |
| 8,413,390 | B2 * | 4/2013 | Pereira | E04H 12/182 |
| | | | | 52/111 |
| 2013/0248655 | A1 | 9/2013 | Kroll et al. | |
| 2014/0014773 | A1 | 1/2014 | Savian | |
| 2017/0130753 | A1 * | 5/2017 | Kemp | F16B 7/105 |
| 2020/0277059 | A1 * | 9/2020 | Ng | B64D 11/064 |

FOREIGN PATENT DOCUMENTS

| | | |
|---|---|---|
| WO | 2007/072045 | 6/2007 |
| WO | 2014/155354 | 10/2014 |
| WO | 2018/015728 | 1/2018 |
| WO | 2019/070194 | 4/2019 |

* cited by examiner

DIVIDER SCREEN ASSEMBLY

CROSS REFERENCE TO RELATED APPLICATIONS

This application claims the benefit of and priority to United Kingdom Patent Application No. 1805875.0, filed Apr. 9, 2018, and entitled "A Divider Screen Assembly," the entire contents of which are incorporated herein by this reference.

BACKGROUND OF THE INVENTION

The present disclosure relates to a divider screen assembly for an aircraft seating arrangement.

The present invention concerns divider screen assemblies for use in aircraft seating arrangements, for example to provide a divider or privacy screen between two seats of such an arrangement.

More particularly, but not exclusively, this invention concerns a divider screen assembly comprising a divider screen moveable between a lower height in a stowed configuration, and an upper height in a deployed configuration, and a first actuation mechanism being actuable to allow movement of the divider screen between the upper height and an intermediate height in between the upper height and the lower height.

The invention also concerns an aircraft accommodation arrangement, a method of stowing a divider screen and a method of deploying a divider screen.

Various examples of prior art divider screens exist.

For example, EP 1582457 discloses a privacy screen adjoining a seat. The screen can be moved from a use (upper) position to a rest (lower) position where it is retracted in a receptacle. A positioning part is used to move the screen from the rest position to a use position and vice versa.

US2013248655 discloses a partition of a privacy wall that can be raised and lowered in between two seats, depending on the desired degree of privacy desired.

The Qatar Airways Q suite business class seat arrangement includes a divider wall that separates two centre seats. The divider wall is spring-loaded and can be manually pushed downwards and then latched in its lower position. In the lower position, the wall is out of the way and a double bed can be created with the two seats.

However, none of these examples provide an arrangement where the divider screen can be effectively used as both a privacy screen (to provide different privacy/vision levels at eye level of passengers in the seats) and as a console wall divider (to provide physical separate between the seats that can be lowered to allow the seats to lie adjacent each other to form a double bed).

The present invention seeks to mitigate the above-mentioned problems. Alternatively or additionally, the present invention seeks to provide an improved divider screen assembly.

SUMMARY OF THE INVENTION

The present invention provides, according to a first aspect, a divider screen assembly for an aircraft seating arrangement, the divider screen assembly comprising a divider screen moveable between a lower height in a stowed configuration, and an upper height in a deployed configuration, a first actuation mechanism being actuable to allow movement of the divider screen between the upper height and an intermediate height in between the upper height and the lower height, a second actuation mechanism being actuable to allow movement of the divider screen between the intermediate height and the lower height, wherein the second actuation mechanism is actuable only when the screen has been lowered to the intermediate height.

This arrangement allows the divider screen to be lowered from the upper height to the intermediate height by using a first action (for example, pushing a button). This first action effects movement because the first actuation mechanism has been actuated to allow the movement. When the screen has lowered to the intermediate height, the first action does not effect any further movement downwards. Of course, it could still be used in reverse to raise the screen towards the upper height again. In order to effect further movement down, the second actuation mechanism needs to be actuated to allow the further downwards movement. Then the screen can be lowered from the intermediate height to the lower height. The screen can also be raised back up to the intermediate height. However, the screen cannot be raised higher than this intermediate height without (re-) actuating the first actuation mechanism.

This means that a first movement between the upper and intermediate heights means that the divider screen effectively works as a privacy screen (between the eye level of two passengers sitting in seats either side of the screen). The second movement between the intermediate and lower heights means that the divider effectively works as a console divider (able to separate the seats but then also lower to allow a double bed to be formed between the two seats either side of the screen).

In the lower height, the screen may be at an angle of approximately 3 degrees, in order to provide a horizontal bed surface (allowing for an aircraft longitudinal angle in flight of 3 degrees). This may be achieved by the use of a stopper on one side of the screen to prevent the middle panel fully lowering at that side.

The lower height may be 20 to 50 cm, preferably 30 to 40 cm and most preferably approximately 33 cm from the bottom of the screen.

The intermediate height may be 60 to 90 cm, preferably 70 to 80 cm and most preferably approximately 75 cm from the bottom of the screen.

The upper height may be 90 to 135, preferably 100 to 125 cm and most preferably approximately 112.5 cm from the bottom of the screen.

Having a second actuation mechanism that needs to be actuated in order to effect the second movement means that the screen cannot accidentally be lowered too far. For example, it is appropriate that the divider screen is only lowered below the intermediate height if both seat occupants desire it.

Preferably, the second actuation mechanism may comprise a plurality of actuators and may only be actuable if two or more of the actuators (e.g. both of them) are actuated at the same time. The actuators may be located at a distance apart. This prevents inadvertent actuation.

Preferably, one or more actuators of the second actuation mechanism may be located in a position that is not readily visible or accessible. For example, a passenger in one of the seats is not likely to be able to see or access the actuator from their seat. This provides for the second actuation mechanism preferably being actuated by aircraft/cabin crew only.

Preferably, the first actuation mechanism is actuable only when the divider screen has been raised to the intermediate height. This means that the first actuation mechanism cannot be actuated during the second movement (in between the intermediate height and the lower height).

Preferably, only one of the first and second actuation mechanisms can be actuated at any one time. This means that the first movement action is prevented while the second movement action is occurring and vice versa. This minimizes the number of moving parts of the screen moving at any one time and prevents accidents (e.g. trapped clothing) etc.

Preferably, the divider screen assembly further comprises a third actuation mechanism, the third actuation mechanism being actuable to allow movement of the divider screen between the intermediate height and the lower height. Having a third actuation mechanism prevents the divider screen accidentally or inadvertently raising from the lower (bed) height.

More preferably, both the second and third actuation mechanism have to have been actuated to allow the divider screen to move between the intermediate height and the lower height.

Preferably, the divider screen comprises an upper panel and a lower section and wherein movement of the divider screen between the upper and intermediate heights involves raising and lowering of the upper panel in relation to the lower section. This provides an efficient arrangement.

More preferably, the lower section comprises a middle panel and a base section and wherein movement of the divider screen between the intermediate and lower heights involves raising and lowering of the middle panel in relation to the base section. This provides an efficient arrangement.

Even more preferably, movement of the divider screen between the intermediate and lower heights also involves corresponding raising and lowering movement of the upper panel with the middle panel. In other words, the upper and middle panels move together in relation to the base section.

Preferably, at least some of the panels and sections telescope in relation to each other during movement of the divider screen. In other words, the panels and sections form a nested cassette. This provides a compact arrangement.

Preferably, the first actuation mechanism comprises an upper panel release mechanism to release movement of the upper panel in relation to the lower section, when the divider screen is at the intermediate height. More preferably, the upper panel is released from the middle panel of the lower section.

More preferably, the upper panel release mechanism comprises an upper panel mechanical locking mechanism to mechanically lock and unlock the upper panel to and from the lower section, and preferably to and from the middle panel of the lower section.

Preferably, the upper panel release mechanism comprises an upper panel electrical connection mechanism to connect and disconnect electrical power to and from the upper panel to effect movement of the upper panel in relation to the lower section.

Preferably, the second actuation mechanism comprises a middle panel release mechanism to release movement of the middle panel in relation to the base section, when the divider screen is at the intermediate height.

More preferably, the middle panel release mechanism comprises a middle panel mechanical locking mechanism to mechanically lock and unlock the middle panel to and from the base section.

Preferably, the middle panel release mechanism comprises a middle panel electrical connection mechanism to connect and disconnect electrical power to and from the middle panel to effect movement of the middle panel in relation to the base section.

Preferably, the assembly comprises a mechanical latch that provides the upper panel mechanical locking mechanism and the middle panel mechanical locking mechanism, wherein the latch has two configurations; a first configuration in which the latch unlocks the upper panel from the middle panel and locks the middle panel to the base section, and a second configuration in which the latch unlocks the middle panel from the base section and locks the upper panel to the middle panel. This allows the mechanical latch to de-actuate the first actuation mechanism and actuate the second actuation mechanism and vice versa.

Preferably, the assembly comprises an electrical switch arrangement that provides the upper panel electrical connection mechanism and the middle panel electrical connection mechanism, wherein the switch arrangement has two configurations; a first configuration in which the switch arrangement connects electrical power to the upper panel and disconnects electrical power from the middle panel, and a second configuration in which the switch arrangement connects electrical power to the middle panel and disconnects electrical power from the upper panel. This allows the switch arrangement to de-actuate the first actuation mechanism and actuate the second actuation mechanism and vice versa.

More preferably, the mechanical latch and electrical switch arrangement are connected such that the latch and switch arrangement are either both in their first configurations or both in their second configurations. This means that the electrical power supply and physical locking/unlocking always correspond to allow the correct movement.

Preferably, the third actuation mechanism comprises a second middle panel release mechanism to release movement of the middle panel in relation to the base section, when the divider screen is at the lower height. This means that middle panel can only be released for upwards movement from the lower height if the second middle panel release mechanism is released.

More preferably, the second middle panel release mechanism comprises a second middle panel mechanical locking mechanism to mechanically lock and unlock the middle panel to and from the base section.

Preferably, the second middle panel release mechanism comprises a second middle panel electrical connection mechanism to connect and disconnect electrical power to and from the middle panel to effect movement of the middle panel in relation to the base section.

According to a second aspect of the invention there is also provided an aircraft accommodation arrangement comprising two seats, convertible to beds and the divider screen of any preceding claim disposed between the two seats.

According to a third aspect of the invention there is also provided a method of stowing a divider screen in an aircraft seating arrangement, from a deployed configuration, at an upper height, to a stowed configuration, at a lower height, the method comprising the steps of having a first actuation mechanism actuated to allow movement of the divider screen from the upper height to an intermediate height in between the upper height and the lower height, and, when at the intermediate height, actuating a second actuation mechanism to allow movement of the divider screen between the intermediate height and the lower height.

According to a fourth aspect of the invention there is also provided a method of deploying a divider screen in an aircraft seating arrangement, from a stowed configuration, at a lower height, to a deployed configuration, at an upper height, the method comprising the steps of having an actuation mechanism actuated to allow movement of the divider screen from the lower height to an intermediate height in between the upper height and the lower height, and, when at the intermediate height, actuating a different actuation mechanism to allow movement of the divider screen between the intermediate height and the upper height.

It will of course be appreciated that features described in relation to one aspect of the present invention may be incorporated into other aspects of the present invention. For example, the methods of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
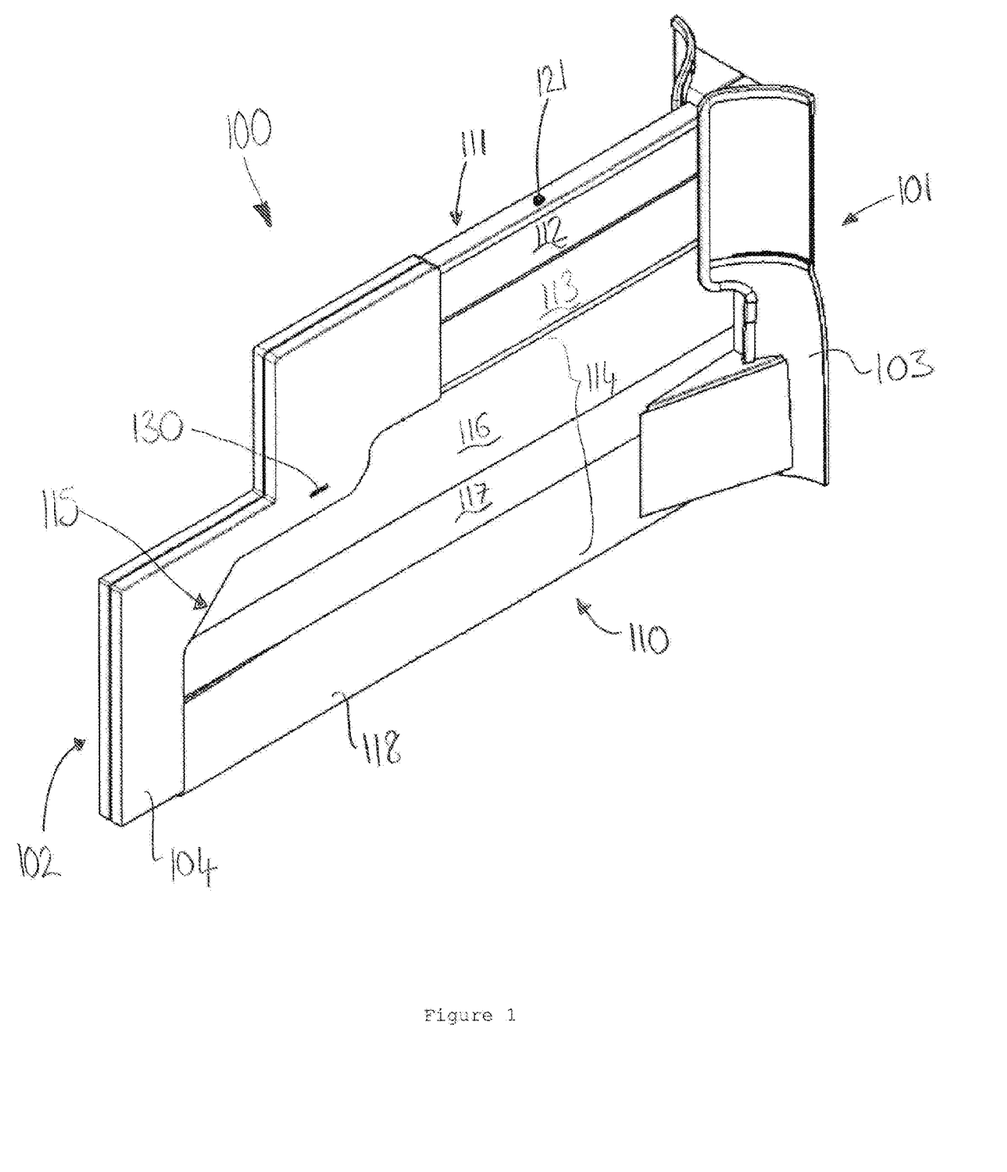
FIG. 1 shows a perspective view of a divider screen assembly according to a first embodiment of the invention, with a divider screen in a deployed configuration at an upper height.

FIG. 1 shows a perspective view of a divider screen assembly 100. The divider screen assembly comprises a frame 104 at a "head end" 102 of the assembly and a footwell console 103 at a "footwell end" 101 of the assembly. A divider screen 110 is mounted in between the frame 104 and footwell console 103. The divider screen 110 is mounted in a cantilevered fashion, such that it is supported by the footwell console 103 and simply guided in the frame 104.

The divider screen 110 comprises a number of different elements; an upper privacy screen (or panel) 111, a middle panel 115 and a base section 118. The base section 118 is located adjacent an aircraft floor (not shown) and is fixedly mounted extending between the frame 104 and footwell console 103. The middle panel 115 and the base section 118 define a console divider 114, i.e. they provide a divider between and at the level of two seats, one located in front of the screen 110 (as orientated in FIG. 1) and one located behind the screen 110. The upper privacy screen 111 provides a privacy screen to provide a screen between the eye level of passengers sat in the seats.

The upper privacy screen 11 has two panels; a top upper panel 112 and a bottom upper panel 113. The middle panel is also made up of two panels; a top middle panel 116 and a bottom middle panel 117. The top upper panel 112 telescopes in and out of the bottom upper panel 113. When fully telescoped out, as shown in FIG. 1, the divider screen is at its maximum upper height and in a fully deployed position. The top upper panel 112 can telescope into the bottom upper panel 113 to reduce the height of the divider screen 110.

Figure 2:
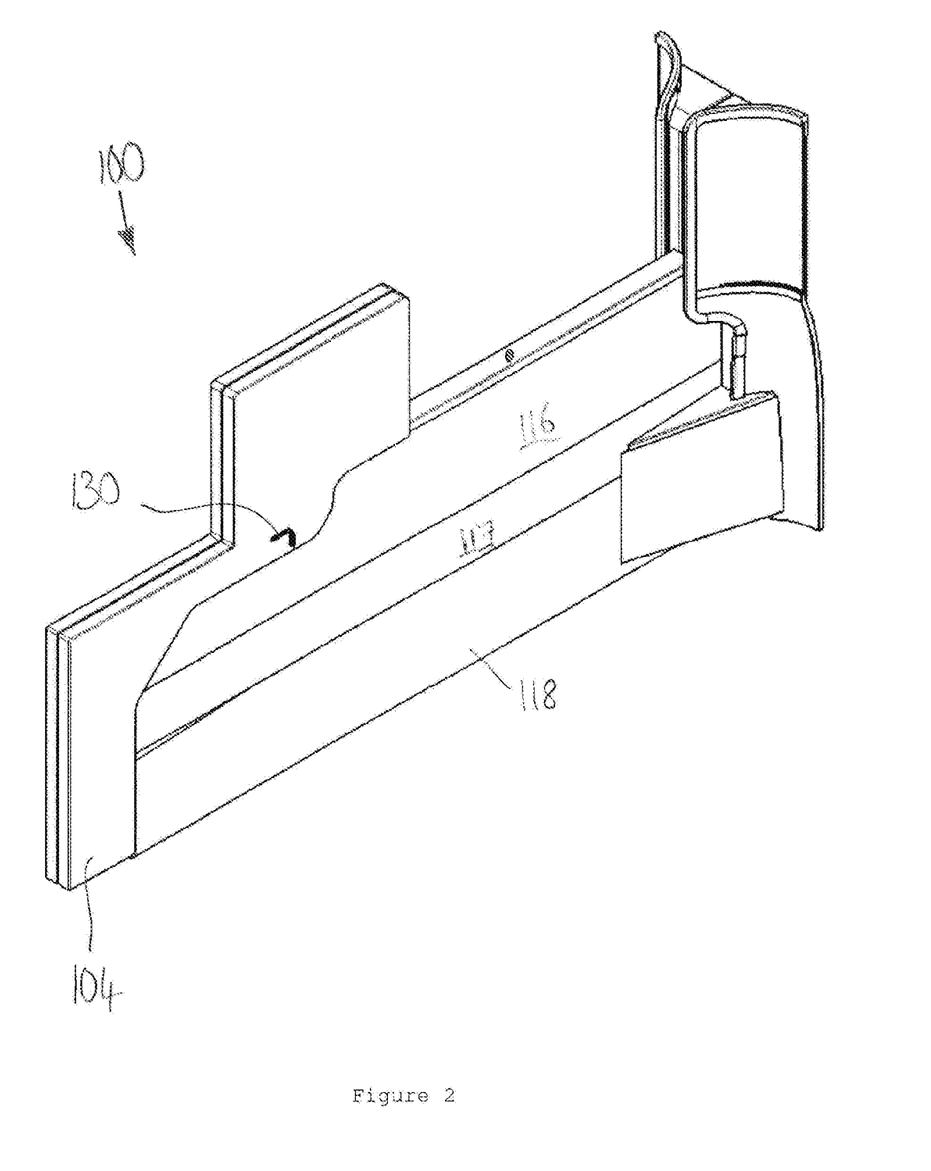
FIG. 2 shows the divider screen assembly of FIG. 1, with the divider screen in a partially deployed configuration at an intermediate height.

The bottom upper panel 113 can then telescope into the middle panel 115 (in particular, top middle panel 116) to reduce the height of the divider screen 110 to an intermediate height shown in FIG. 2. Here, the top upper panel 112 and bottom upper panel 113 are located within top middle panel 116. Here, the privacy screen 111 has been fully stowed within the console divider 114.

Figure 4:
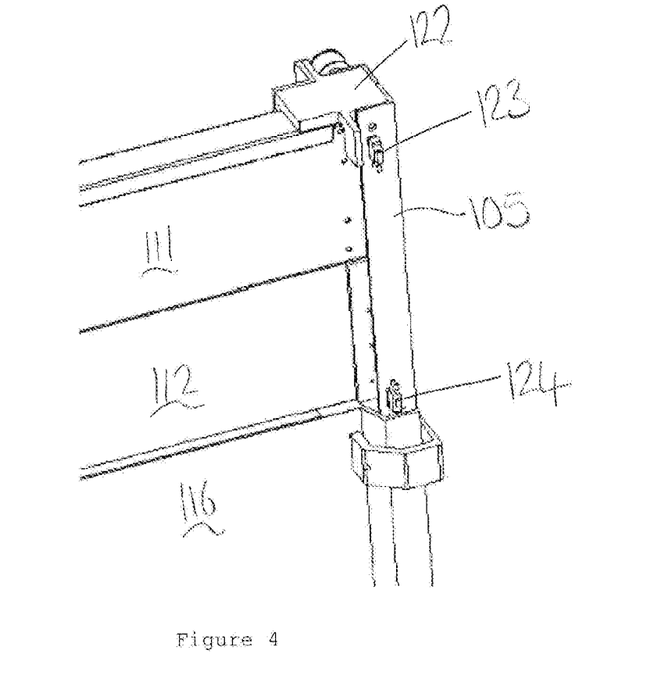
FIG. 4 shows a close-up perspective view, from the other side as FIGS. 1, 2 and 3, of a head end of the divider screen assembly, with the divider screen in the deployed configuration at the upper height.
Figure 7:
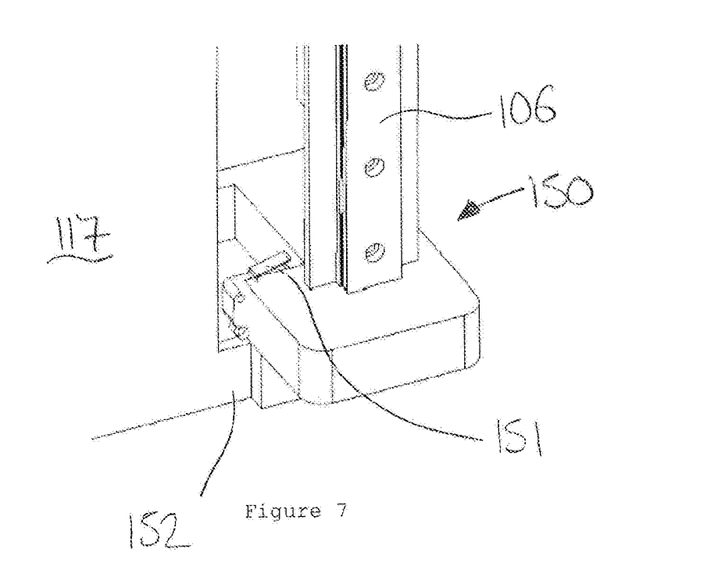
FIG. 7 shows a close-up perspective view, from the same side as FIGS. 1, 2, 3 and 5, of a footwell end of the divider screen assembly, with the divider screen in the stowed configuration at the lower height.

The privacy screen 111 is guided in by a guide tab 122 attached to the head ends of the privacy screens 112, 113. The guide tab 122 is held in a guide rail 105 of the frame 104, as can be seen in FIG. 4. A guide and support rail 106 (seen in FIG. 7) is also provided in the footwell console 103.

The movement of the upper privacy screen 111 between the deployed position (at the upper height) in FIG. 1 and the privacy screen 111 stowed position (the divider screen 110 at the intermediate height) is defined as a first movement.

A second movement occurs between the intermediate height (of FIG. 2) and a lowest height (shown in FIG. 3), where the divider screen 110 is fully stowed. This second movement involves telescoping of the top middle panel 116 into the bottom middle panel 117 and the up and down movement of the bottom middle panel 117 next to (outside) the base section 118. This reduces the height of the divider screen 110 to a lowest height shown in FIG. 3. Here, the top middle panel 116 and bottom middle panel 117 are located adjacent the base section 118. Here, the console divider 114 has been fully stowed.

It is noted that the length of the various panels is different. As can be seen clearly in FIG. 1, the top and bottom upper privacy screens 112, 113 have the same length that is approximately 95 cm (but could be 80 to 110 cm or preferably 90 to 100 cm). But top middle panel and bottom middle panels 116, 117 and the base section are longer and have a length of approximately 185 cm (but could be 160 to 210 cm or preferably 175 to 195 cm). The frame 104 is correspondingly shaped to support the head end edges of each of the panels and sections.

The panels get longer the closer they are to the floor to allow a double bed to be formed by the two seats either side of the divider screen 110. The two seats are both convertible to a lie flat bed. When they are in this bed configuration and the divider screen 110 is lowered to the position in FIG. 3, a double bed can be formed using both seats (as beds) and the length of the top of the base section 118 acting as a centre-length line of the double bed formed.

The top line (just seen) of the stowed panels is at an angle of 3 degrees to the horizontal (floor). This is achieved by a small stopper (not shown) preventing the footwell end of the telescoped panels from reaching the floor.

The first movement, as defined above, is only possible when a first actuation mechanism (described later) has been actuated. If that first actuation mechanism has been actuated, the first movement can be effected by pressing on the button(s) 121 at the top of the top upper privacy panel 112.

This causes the privacy screen 111 to raise and lower. This raises and lowering is achieved using upper and lower movement microswitches 123, 124 shown in FIG. 4 and a drive belt 125 shown in FIG. 5.

Figure 3:
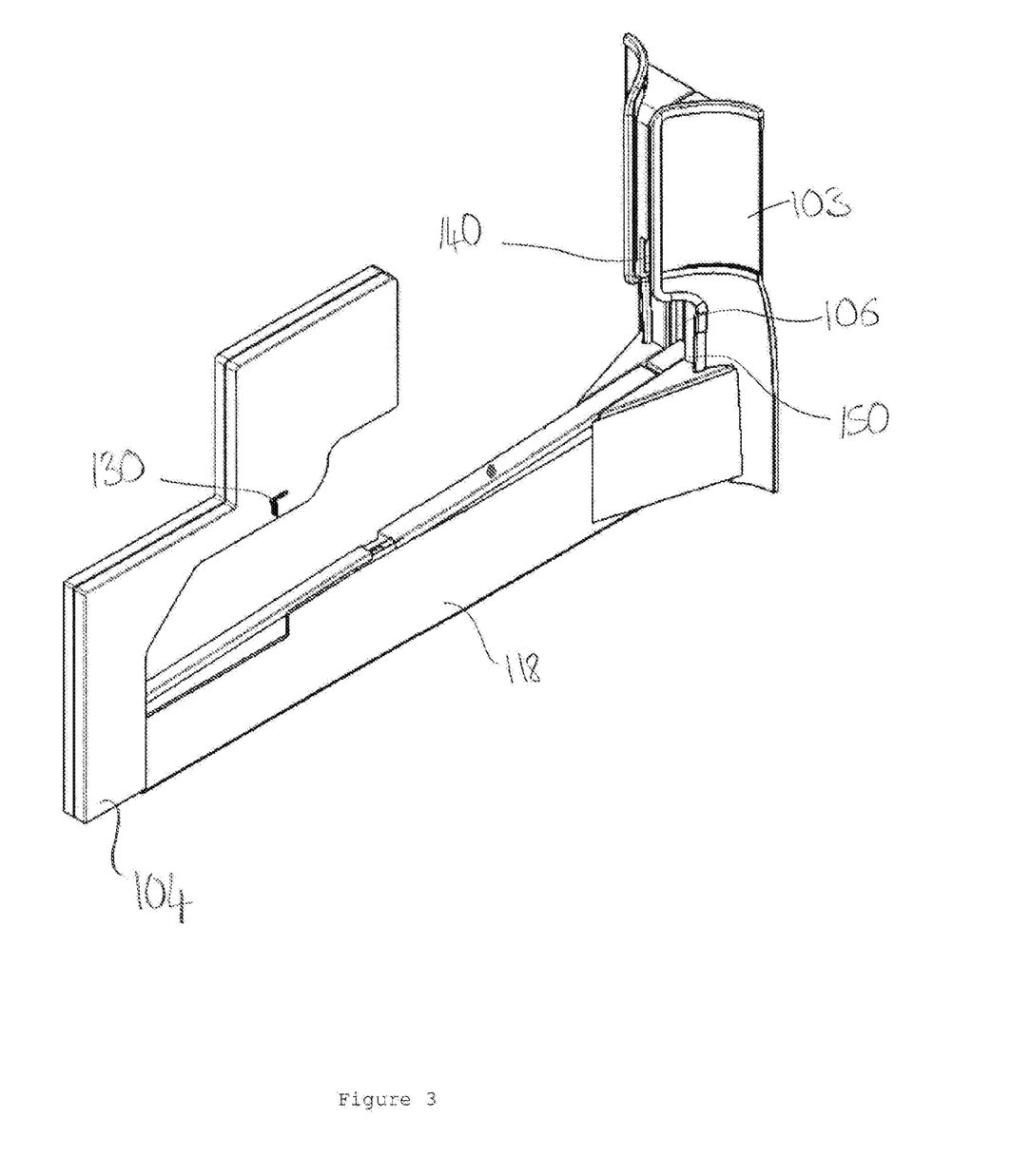
FIG. 3 shows the divider screen assembly of FIGS. 1 and 2, with the divider screen in a stowed configuration at a lower height.

If the privacy screen 111 is lowered to the position shown in FIG. 2, an exposed latch 130 located on the frame 104, as shown in FIGS. 1, 2 and 3 can be triggered. It is triggered by moving it from its horizontal position, shown in FIG. 1 to its vertical position in FIGS. 2 and 3. The triggering can also be reversed by moving it back to its horizontal position.

The triggering/reversing of the exposed latch 130 causes movement of a slider 132 in relation to a latch frame 131. The slider 132 is moveable from the retracted position shown in FIG. 5, when the exposed latch 130 is in its horizontal position) to a non-retracted position (the latch moved further right as orientated in FIG. 5) when the exposed latch is in its vertical position.

The slider 132 is connected to a tab 135 that is mounted in the frame 131 and moveable with the slider 132. When the tab 135 is shown in the retracted position of FIG. 5, the tab acts to physically lock the middle panel 115 to the frame 104 (and not physically lock the upper privacy screen 111 to the middle panel 115). When the tab 135 is in the non-retracted position, the tab instead acts to physically lock the upper privacy screen 111 to the middle panel 115 and not to physically lock the middle panel 115 to the frame 104. Hence, the tab 135 moves from a retracted position where the upper privacy screen 111 movement is unlocked (first movement) to a non-retracted position where the middle panel 115 movement is unlocked (second movement).

Figure 5:
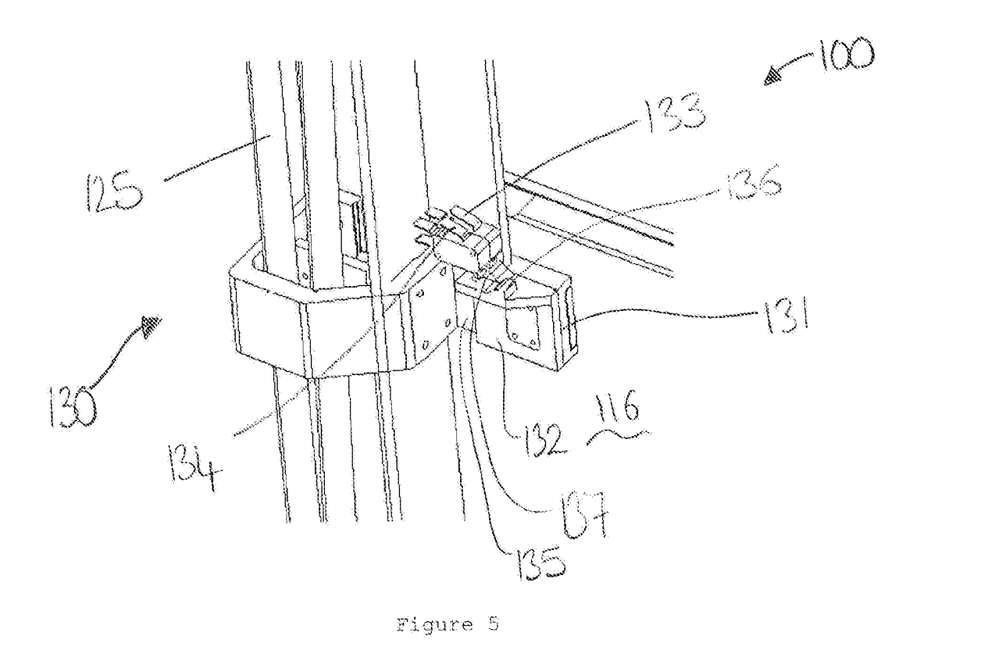
FIG. 5 shows a close-up perspective view, from the same side as FIGS. 1, 2 and 3, of a head end of the divider screen assembly, with the divider screen in the partially deployed configuration at the intermediate height.

On the top of the slider 132 is a nub 136. This nub 136 interacts with a sprung switcher 137, biased towards an outer position. In the position of FIG. 5, the nub prevents outward movement of the sprung switcher 137 and so the sprung switcher 137 is located in its inner position. Here it actuates the privacy screen microswitch 133 above it and thus allows electrical power to be supplied to the privacy screen to effect the first movement. When the slider 132 moves to the non-retracted position, the sprung switcher 137 is able to move to its outer position (biased under the spring action). This de-actuates the privacy screen microswitch 133 and actuates the middle panel microswitch 134. Thus, electrical power is supplied to the middle panel 115 to effect the second movement. This second movement occurs by pressing button(s) 121, the functionality of the button(s) 121 having been changed by the sprung switcher 137 so that they are now used to effect the second movement. The sprung switcher 137 also causes interaction with the drive belt 125 such that the belt now effects movement of the middle panel 115. When the exposed latch 130 is moved back (reversed) to its horizontal position, this sequence is reversed.

Hence, when the exposed latch 130 is in its horizontal position (of FIG. 1), the first actuation mechanism is actuated such that the first movement can occur. The second actuation mechanism is de-actuated such that the second movement cannot occur. When the exposed latch 130 is in its vertical position (of FIGS. 2 and 3), the first actuation mechanism is de-actuated such that the first movement cannot occur. The exposed second actuation mechanism is actuated such that second movement can occur if a hidden second actuation mechanism (see below) is also actuated.

Figure 6:
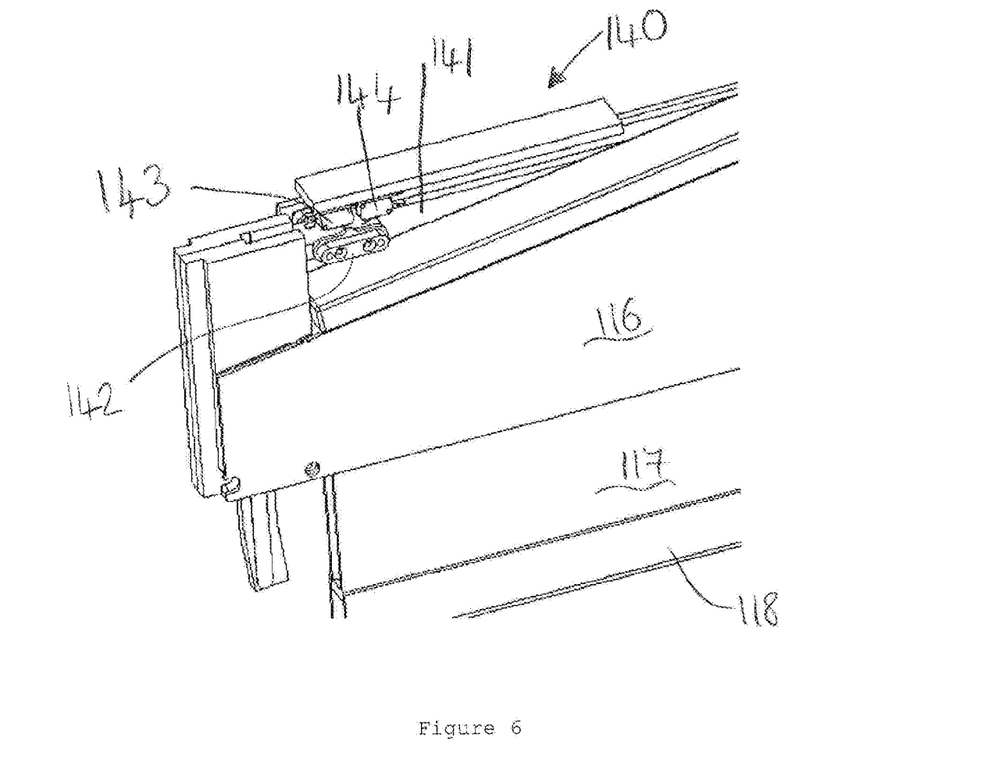
FIG. 6 shows a close-up perspective view, from the other side as FIGS. 1, 2, 3 and 5, of a footwell end of the divider screen assembly, with the divider screen in the partially deployed configuration at the intermediate height.

The divider screen assembly 100 also comprises a hidden latch 140 shown in FIG. 6. This hidden latch is located at the footwell end 101 of the assembly and is not readily visible/accessible to a passenger. The hidden latch 140 comprises a slidable bar 141. The bar 141 is attached to a second switcher 142. When the slidable bar 141 is in its leftmost position (as shown in FIG. 6), the switcher 142 actuates a second privacy screen microswitch 143 above it and thus allows electrical power to be supplied to the privacy screen to effect the first movement. When the bar is in its rightmost position, the switcher 142 is moved to the right underneath second middle panel microswitch 144 and actuates it and thus allows electrical power to be supplied to the middle panel 115 to effect the second movement.

Importantly, both the hidden and the exposed latches 130, 140 have to be triggered to actuate both hidden and exposed second actuation mechanisms and allow the second movement. Both have to be reversed to allow the first movement. When the hidden latch 140 is in its leftmost position and the exposed latch 130 is in its horizontal position, the first actuation mechanism is actuated, such that first movement is powered and unlocked. When the hidden latch 140 is in its rightmost position and the exposed latch 130 is in its vertical position, the second actuation mechanism is actuated such that second movement is powered and unlocked.

The divider screen assembly 100 also comprises a third actuation mechanism that also needs to be triggered to allow movement from the lowest height (of FIG. 3) upwards. In other words, this needs to be triggered in order to raise the console divider from the double bed configuration. The third actuation mechanism 150 is located adjacent the guide and support rail 106 of the footwell console 103. It comprises a bed microswitch 151 and a sliding latch 152. The bed microswitch 151 connects and disconnects the middle panel 115 from electrical power. The sliding latch 152 unlocks and locks the middle panel 115 to and from the base section 118.

In use, in a starting (fully deployed) position, a passenger in either seat can choose the desired height of the upper privacy screen 111 of the divider screen 110 by pressing the button(s) 121. This raises and lowers the upper privacy screen 111 between the intermediate height and the upper height (first movement).

When both passengers wish to stow the console divider 114, to be able to form a double bed, a crew member arranges for the exposed latch 130 and the hidden latch 140 to be triggered. This causes the upper privacy screen 111 to be locked to the middle panel 115 and for the middle panel 115 to be unlocked from the frame 104. It also de-actuates privacy screen microswitches 133, 143 and actuates middle panel microswitches 134, 144 so that electrical power is supplied to the middle panel 115 to effect second movement.

Once the middle panel 115 has fully lowered into the base section 118, third actuation mechanism 150 is automatically reversed such that the middle panel 115 is physically locked to the base section 118 by sliding latch 152 and electrical power is disconnected from the middle panel by microswitch 151.

When both passengers wish to raise the console divider 114 and come out of the double bed configuration, a crew member arranges for the third actuation mechanism 150 to be triggered such that the middle panel 115 is physically unlocked from the base section 118 by sliding latch 152 and electrical power is re-connected to the middle panel by microswitch 151. The middle panel 115 can then be raised up to the intermediate position.

The crew member then arranges for the exposed latch 130 and the hidden latch 140 to be reversed. This causes the upper privacy screen 111 to be unlocked from the middle panel 115 and for the middle panel 115 to be locked to the frame 104. It also re-actuates privacy screen microswitches 133, 143 and de-actuates middle panel microswitches 134, 144 so that electrical power is supplied to the privacy screen to effect first movement.

Hence, it can be seen that the following elements can be considered to form part of the first actuation mechanism (i.e. the actuation mechanism to allow first movement): exposed latch 130, slider 132, privacy screen microswitch 133, tab 135, nub 136, sprung switcher 137, hidden latch 140, slidable bar 141, second switcher 142 and second privacy screen microswitch 143.

The following elements can be considered to form part of the second actuation mechanism (i.e. the actuation mechanism to allow second movement): exposed latch 130, slider 132, middle panel microswitch 134, tab 135, nub 136, sprung switcher 137, hidden latch 140, slidable bar 141, second switcher 142 and second middle panel microswitch 144.

The following elements can be considered to form part of the third actuation mechanism 150 (i.e. the actuation mechanism to allow the divider screen to be raised from the lowest height): bed microswitch 151 and sliding latch 152.

The following elements can be considered to act to effect movement (once allowed) of the divider screen: guide rail 105, guide and support rail 106, button(s) 121, guide tab 122, movement microswitches 123, 124 and drive belt 125.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The drive belt may be replaced or supplemented with a drive chain, gas strut, lead screw or any other suitable movement actuation arrangement.

The latches 130, 140, 150 and buttons 121 etc. may be located in any suitable location on the deployable screen assembly.

The footwell console 103 may instead be replaced by any suitable console or frame structure.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

It should be noted that throughout this specification, "or" should be interpreted as "and/or".

The invention claimed is:

1. A divider screen assembly for an aircraft seating arrangement, the divider screen assembly comprising:
    a divider screen moveable between a lower height in a stowed configuration, and an upper height in a deployed configuration,
    a first actuation mechanism being actuable to allow movement of the divider screen between the upper height and an intermediate height in between the upper height and the lower height,
    a second actuation mechanism being actuable to allow movement of the divider screen between the intermediate height and the lower height,
    wherein the divider screen comprises an upper panel and a lower section and wherein movement of the divider screen between the upper and intermediate heights involves raising and lowering of the upper panel in relation to the lower section,
    wherein the second actuation mechanism is actuable only when the screen has been lowered to the intermediate height, and
    wherein the first actuation mechanism comprises an upper panel release mechanism to release movement of the upper panel in relation to the lower section, when the divider screen is at the intermediate height, and wherein the upper panel release mechanism comprises an upper panel mechanical locking mechanism to mechanically lock and unlock the upper panel to and from the lower section.

2. A divider screen assembly as claimed in claim 1, wherein the first actuation mechanism is actuable only when the divider screen has been raised to the intermediate height.

3. A divider screen assembly as claimed in claim 1, wherein only one of the first and second actuation mechanisms can be actuated at any one time.

4. A divider screen assembly as claimed in claim 1, wherein the divider screen assembly further comprises a third actuation mechanism, the third actuation mechanism being actuable to allow movement of the divider screen between the intermediate height and the lower height.

5. A divider screen assembly as claimed in claim 4, wherein both the second and third actuation mechanism have to have been actuated to allow the divider screen to move between the intermediate height and the lower height.

6. A divider screen assembly as claimed in claim 4, wherein the third actuation mechanism comprises a second middle panel release mechanism to release movement of the middle panel in relation to a base section, when the divider screen is at the lower height.

7. A divider screen assembly as claimed in claim 6, wherein the second middle panel release mechanism comprises a second middle panel mechanical locking mechanism to mechanically lock and unlock the middle panel to and from the base section.

8. A divider screen assembly as claimed in claim 6, wherein the second middle panel release mechanism comprises a second middle panel electrical connection mechanism to connect and disconnect electrical power to and from the middle panel to effect movement of the middle panel in relation to the base section.

9. A divider screen assembly as claimed in claim 1, wherein the lower section comprises a middle panel and a base section and wherein movement of the divider screen between the intermediate and lower heights involves raising and lowering of the middle panel in relation to the base section.

10. A divider screen assembly as claimed in claim 9, wherein movement of the divider screen between the intermediate and lower heights also involves corresponding raising and lowering movement of the upper panel with the middle panel.

11. A divider screen assembly as claimed in claim 9, wherein the second actuation mechanism comprises a middle panel release mechanism to release movement of the middle panel in relation to the base section, when the divider screen is at the intermediate height.

12. A divider screen assembly as claimed in claim 11, wherein the middle panel release mechanism comprises a middle panel mechanical locking mechanism to mechanically lock and unlock the middle panel to and from the base section.

13. A divider screen assembly as claimed in claim 12, wherein the assembly comprises a mechanical latch that provides the upper panel mechanical locking mechanism and the middle panel mechanical locking mechanism, wherein the latch has two configurations; a first configuration in which the latch unlocks the upper panel from the middle panel and locks the middle panel to the base section, and a second configuration in which the latch unlocks the middle panel from the base section and locks the upper panel to the middle panel.

14. A divider screen assembly as claimed in claim 13, wherein the assembly comprises an electrical switch arrangement that provides the upper panel electrical connection mechanism and the middle panel electrical connection mechanism, wherein the switch arrangement has two configurations; a first configuration in which the switch arrangement connects electrical power to the upper panel and disconnects electrical power from the middle panel, and a second configuration in which the switch arrangement connects electrical power to the middle panel and disconnects electrical power from the upper panel.

15. A divider screen assembly as claimed in claim 14, wherein the mechanical latch and electrical switch arrangement are connected such that the latch and switch arrangement are either both in their first configurations or both in their second configurations.

16. A divider screen assembly as claimed in claim 11, wherein the middle panel release mechanism comprises a middle panel electrical connection mechanism to connect and disconnect electrical power to and from the middle panel to effect movement of the middle panel in relation to the base section.

17. A divider screen assembly as claimed in claim 1, wherein at least some of the panels and sections telescope in relation to each other during movement of the divider screen.

18. A divider screen assembly as claimed in claim 1, wherein the upper panel release mechanism is able to release movement of the upper panel in relation to the middle panel, when the divider screen is at the intermediate height.

19. A divider screen assembly as claimed in claim 18, wherein the upper panel mechanical locking mechanism is able to mechanically lock and unlock the upper panel to and from the middle panel of the lower section.

20. A divider screen assembly as claimed in claim 18, wherein the upper panel release mechanism comprises an upper panel electrical connection mechanism to connect and disconnect electrical power to and from the upper panel to effect movement of the upper panel in relation to the lower section.

21. An aircraft accommodation arrangement comprising two seats, convertible to beds and the divider screen of claim 1 disposed between the two seats.

22. A method of stowing a divider screen in an aircraft seating arrangement, from a deployed configuration, at an upper height, to a stowed configuration, at a lower height, wherein the divider screen comprises an upper panel and a lower section and wherein movement of the divider screen between the upper and intermediate heights involves raising and lowering of the upper panel in relation to the lower section, the method comprising the steps of:
  having a first actuation mechanism actuated to allow movement of the divider screen from the upper height to an intermediate height in between the upper height and the lower height, and,
  when at the intermediate height, actuating an upper panel mechanical locking mechanism to mechanically lock the upper panel to the lower section, actuating a second actuation mechanism to allow movement of the divider screen between the intermediate height and the lower height, wherein the second actuation mechanism is actuable only when the divider screen has been lowered to the intermediate height.

23. A method of deploying a divider screen in an aircraft seating arrangement, from a stowed configuration, at a lower height, to a deployed configuration, at an upper height, wherein the divider screen comprises an upper panel and a lower section, wherein movement of the divider screen between the upper and intermediate heights involves raising and lowering of the upper panel in relation to the lower section, and wherein the upper panel is mechanically locked to the lower section by an upper panel mechanical locking mechanism, the method comprising the steps of:
  having an actuation mechanism actuated to allow movement of the divider screen from the lower height to an intermediate height in between the upper height and the lower height, wherein the actuation mechanism is actuable only when the divider screen is at or below the intermediate height, and,
  when at the intermediate height, actuating the upper panel mechanical locking mechanism to mechanically unlock the upper panel from the lower section, and actuating a different actuation mechanism to allow movement of the divider screen between the intermediate height and the upper height.

* * * * *

UNITED STATES PATENT AND TRADEMARK OFFICE
CERTIFICATE OF CORRECTION

PATENT NO. : 11,225,327 B2
APPLICATION NO. : 16/279332
DATED : January 18, 2022
INVENTOR(S) : Bethmage Kalpa Nadeeshan Perera et al.

It is certified that error appears in the above-identified patent and that said Letters Patent is hereby corrected as shown below:

On the Title Page

In Item (71) Line 1: Replace "Safran Seats GB Limited, Wales (GB)" with --Safran Seats GB Limited, Cwmbran (GB)--.

In Item (72) Lines 1-5: Replace "Bethmage Kalpa Nadeeshan Perera, Wales (GB)" with --Bethmage Kalpa Nadeeshan Perera, Cwmbran (GB)--.
"Patrick James Smith, Wales (GB)" with --Patrick James Smith, Cwmbran (GB)--.
"Piumal Shayanga Wijewickrama, Wales (GB)" with --Piumal Shayanga Wijewickrama, Cwmbran (GB)--.
"Paul John Wills, Wales (GB)" with --Paul John Wills, Cwmbran (GB)--.

In Item (73) Line 1: Replace "Safran Seats GB Limited, Wales (GB)" with --Safran Seats GB Limited, Cwmbran (GB)--.

In Item (30) Line 1: Replace "1805875" with --1805875.0--.

Signed and Sealed this
Twentieth Day of September, 2022

Katherine Kelly Vidal
*Director of the United States Patent and Trademark Office*